United States Patent
Park

(10) Patent No.: US 6,308,233 B1
(45) Date of Patent: Oct. 23, 2001

(54) CIRCUIT ALLOWING INSERTION/ EXTRACTION OF A BOARD IN A SYSTEM DURING NORMAL OPERATION

(75) Inventor: Dong-Hyun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/119,289

(22) Filed: Jul. 20, 1998

(30) Foreign Application Priority Data

Jul. 19, 1997 (JP) .................................................. 9-033896

(51) Int. Cl.⁷ ...................................................... G06F 13/00
(52) U.S. Cl. ........................... 710/103; 710/101; 710/102
(58) Field of Search ................................... 710/101, 102, 710/103

(56) References Cited

U.S. PATENT DOCUMENTS

| | | | |
|---|---|---|---|
| 4,513,341 | * 4/1985 | Kollanyi | 361/91 |
| 4,766,601 | * 8/1988 | Hammond | 375/59 |
| 5,092,799 | * 3/1992 | Kimura | 439/59 |
| 5,247,619 | 9/1993 | Mutoh et al. . | |
| 5,272,584 | 12/1993 | Austruy et al. . | |
| 5,297,272 | * 3/1994 | Lu et al. | 395/500 |
| 5,384,492 | 1/1995 | Carlson et al. . | |
| 5,539,423 | * 7/1996 | Kim et al. | 345/8 |
| 5,572,395 | * 11/1996 | Rasums et al. | 361/58 |
| 5,629,638 | * 5/1997 | Kumar | 326/121 |
| 5,675,467 | * 10/1997 | Nishimura et al. | 361/58 |
| 5,920,182 | * 7/1999 | Migliavacca | 323/282 |
| 5,951,660 | * 9/1999 | Wonterghem | 710/103 |
| 6,049,221 | * 4/2000 | Ishibashi et al. | 326/30 |

* cited by examiner

Primary Examiner—Robert Beausoleil
Assistant Examiner—Tim Vo
(74) Attorney, Agent, or Firm—Dilworth & Barrese, LLP

(57) ABSTRACT

This invention relates to a circuit allowing insertion and extraction of a board in the system during normal operation. The circuit includes a monitoring circuit detecting the voltage of the board itself, a bilateral buffer and a means to enable and disable bilateral buffer according to the output of the monitoring circuit. In the circuit, when the detected voltage is over a predetermined level, board reset timing is regulated variably so as for the board to reset normally prior to enabling the buffer.

10 Claims, 2 Drawing Sheets

CIRCUIT ALLOWING INSERTION/EXTRACTION OF A BOARD IN A SYSTEM DURING NORMAL OPERATION

FIELD OF THE INVENTION

The present invention relates generally to a circuit allowing insertion and extraction of a board during normal operation, and more particularly to a circuit which detects a voltage of the board itself, opens/closes a buffer and regulates board reset timing when a board is inserted.

DESCRIPTION OF THE RELATED ART

In general, communication base station equipment and other complex electronic systems are formed with a system rack which receives a plurality of removable circuit boards. This configuration maximimizes flexibility and serviceability. When a fault occurs in a board of a communication system or an existing board needs to be replaced with a new board according to demand for a new service of communication system, the existing board currently residing in a card slot must be extracted. When a communication system requires a new board to meet the demand for the new service, the new board must be inserted into a card slot.

It is not difficult to insert a new board or to extract a failing board when a communication system is off. However, during normal operation of the communication system, insertion or extraction of a board can cause problems in the operation of the communication system by affecting the power source of the communication system and by initializing the inserted board in an unreliable manner. Currently, there are methods for inserting and extracting a board during normal operation of the communication system. Most conventional methods provide a ground connection to the card first and a power supply source to the card later. Even though this method can still render a communication system unstable, it is widely used because an additional circuit is not required to facilitate inserting and extracting of a board.

Another known method is to construct a special circuit for inserting/extracting a board. The stabilizing circuit is supplied with power not from a system itself, but from an external source. This circuit is controlled by the power supplied from the system and the power enables part of the circuit to be stable.

A third method is to gradually apply power by using a resistance and a capacitance to allow the load of the whole communication system to increase gradually, thus avoiding power transients.

While the above stated methods for inserting/extracting a board try to keep the system stable, it is almost impossible to insert/extract a board only using the internal power, not power supplied from the external source. Since the operation of insertion and extraction are different from each other, known methods may allow one of insertion and extraction to be performed normally, while the other operation remains unreliable. In addition, a circuit for inserting/extracting a board is affected according to changes of the temperature. Furthermore, an additional circuit must be provided so that power is supplied from the external source.

U.S. Pat. No. , 5,247,619 discloses a method according to the prior art. This invention provides a method for performing insertion/extraction of a board in an on-line system. This method includes an auxiliary switch circuit which is utilized with software. According to this method, after an LED indicator indicates an ON condition, an extraction condition is prepared. This invention has the advantage of obtaining system stability during an extraction operation. On the other hand, it is complicated to utilize this method because handling of a switch must be made from an external controller. Consequently, it is not easy to perform insertion/extraction of a board into/from a system according to this method.

U.S. Pat. Nos., 5,384,492 and 5,272,584 disclose other methods according to the prior art for inserting/extracting a board in an on-line system. The invention in both patents is characterized by accelerating power to the board.

SUMMARY OF THE INVENTION

The present invention provides a circuit allowing insertion and extraction of a board in a system during normal operation by utilizing a stabilizing circuit which monitors gradually changing voltage, prohibits signal transfer between the system and the board during insertion/extraction and thereby enables normal operation of the system during an insertion/extraction operation.

One preferred embodiment of a circuit allowing insertion and extraction of a board in the system during normal operation includes a monitoring circuit which detects the voltage of the board itself, a bilateral buffer interposed in the signal lines between the board and the system and means to open or close the bilateral buffer according to the output of the monitoring circuit.

When the detected voltage of a board is over a predetermined level, a board reset timing circuit is preferably initialized to maintain the board in a reset state for a predetermined time after a sufficient voltage is present, thereby insuring a reliable reset condition. During the predetermined time, the buffer is disabled, thereby preventing signals from passing between the board and the system while the board is in the reset state.

Preferably, a circuit for detecting and monitoring the voltage of a board includes: a power supervisor integrated circuit (supervisor IC) to which Vcc of the board is applied via a SENSE terminal. The supervisor IC further includes: a CT terminal which is grounded via a capacitor with a capacitance $C_T$, a REF terminal which is grounded via a capacitor with a predetermined value, and a RESET terminal is grounded via a resistance $R_4$. A transistor is included to which one end of the resistance $R_4$ is connected to a base of the transistor via resistance $R_3$, the output of the RESET terminal of the IC is inputted via resistance $R_1$ to an emitter of the transistor, a resistance $R_2$ is connected in parallel with the emitter and the base, and a collector is grounded via resistance $R_5$. A system $\overline{\text{RESET}}$ signal is outputted through the collector terminal.

Preferably, the capacitor $C_t(F)$ has a value given as $C_t(F)=t_d(s)/1.3\times10^4$, where $t_d(s)$ is a board reset time. Preferably, the means to open or close a bilateral buffer is an inverter. It is also preferable that so as to variably regulate the board reset timing, the inverter inputs the system $\overline{\text{RESET}}$ signal to the bilateral buffer, and the bilateral buffer receives the output signal of the inverter and Vcc is applied between the inverter and the bilateral buffer connected with the inverter. Until the detected voltage reaches a predetermined level, the output of the system $\overline{\text{RESET}}$ signal is low. When the detected voltage exceeds the predetermined level, the voltage preferably initializes the reset timer. Upon expiration of the reset timer, the board enters a normal operating state and the bilateral buffer is enabled to pass signals.

In extracting the board from the system, if the detected voltage is less than the predetermined level, the bilateral buffer is disabled which prohibits signals from passing and makes the extraction of the board possible.

DETAILED DESCRIPTION OF PREFERRED EMBODIMENTS

Figure 1:
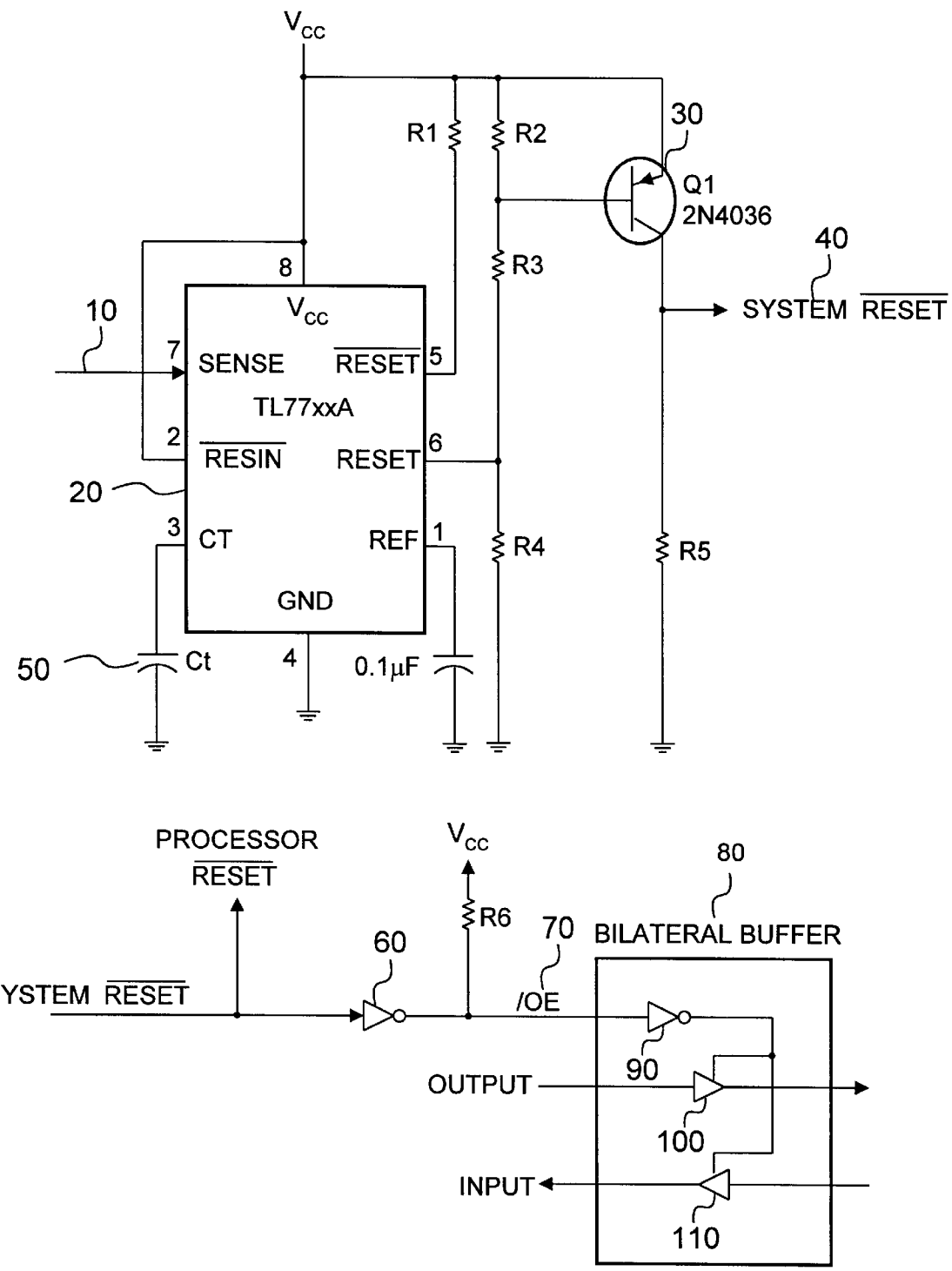
FIG. 1 is a diagram of a circuit allowing insertion/extraction of a board in a system during normal operation according to the present invention.

The present invention will be explained in detail with reference to the accompanying drawings. FIG. 1 is a schematic diagram of a circuit allowing insertion/extraction of a board in a system during normal operation according to the present invention.

When a board is inserted into a system, a voltage, Vcc, is applied to the board and gradually increases from almost 0 volts to approximately 5.0 volts. However, until the voltage of the board reaches a threshold voltage, $V_t$, of about 5% of Vcc (4.75 volts), the circuitry of the board is unstable and signals should not be permitted to pass between the board and the system Only after the voltage exceeds 4.75 volts should signals pass between the system and the board. To further insure system reliability, the board is held in a reset state for a predetermined time delay ($t_d$) after the voltage reaches about 4.75 volts, where $t_d$ is determined to ensure that a complete reset occurs. Similarly, because board extraction takes a finite amount of time, the voltage on the board during extraction gradually drops. When an internal board voltage is less than a threshold of about 4.75 volts, a system $\overline{\text{RESET}}$ signal is generated, and the signal flow between the system and the board is disabled.

Figure 2:
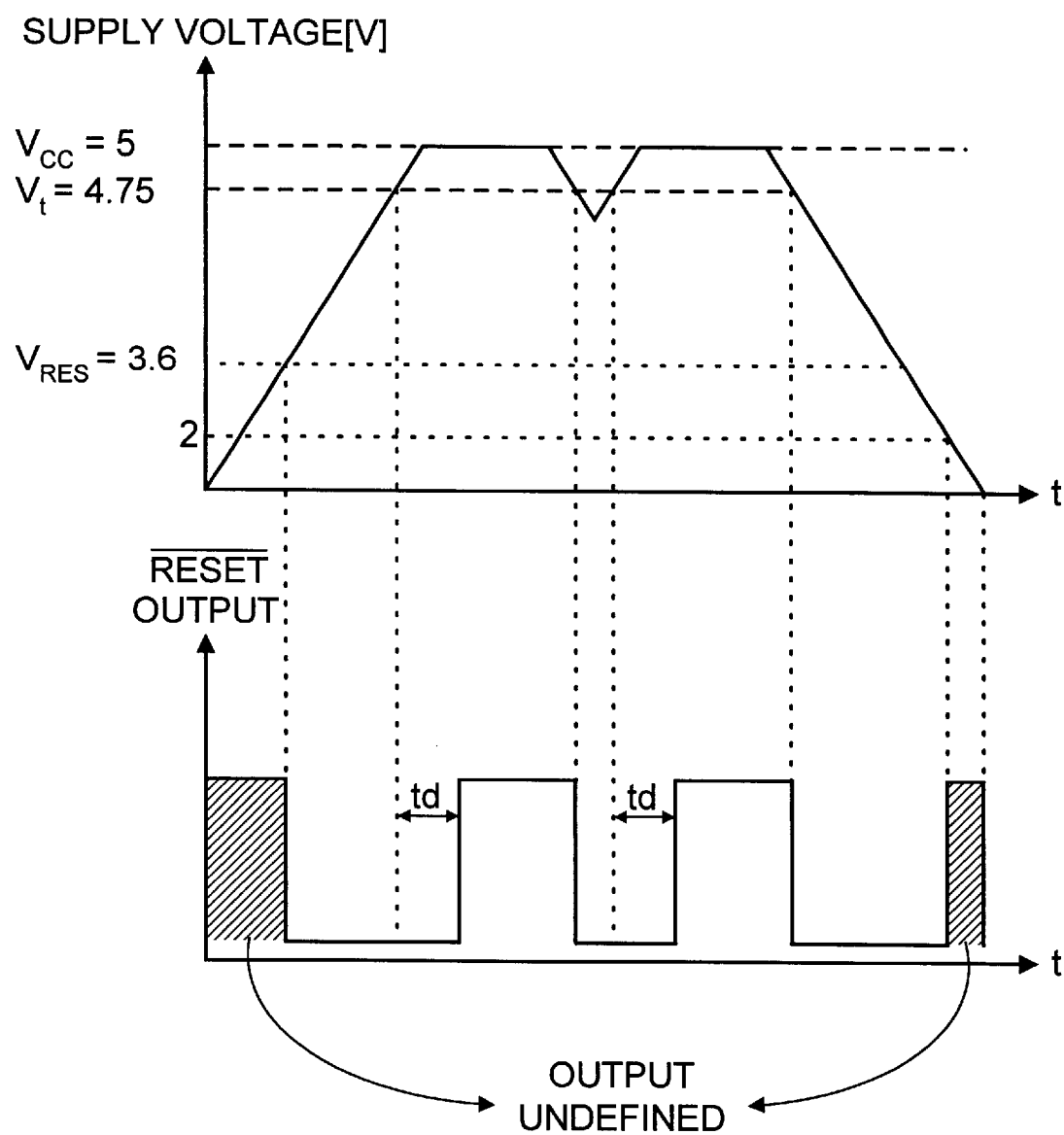
FIG. 2 is a timing diagram of the preferred circuit illustrated in FIG. 1.

The circuit of FIG. 1 includes a power supply voltage supervisor integrated circuit (supervisor IC) 20, such as model number TL 77XX manufactured by Texas Instruments, Incorporated. Vcc of a board being inserted/extracted (10) is applied to a SENSE terminal 7 of the supervisor IC 20. The supervisor IC 20 generates a system $\overline{\text{RESET}}$ signal (40), which enables or disables a bilateral buffer (80), based on a voltage level of the board. As illustrated in FIG. 2, during insertion of a board, Vcc of the board gradually increases. Initially, the output of the supervisor IC 20 is undefined. When the voltage reaches $V_{RES}$, a level of about 3.6 volts, the TL77xxA 20 is enabled and the RESET terminal 6 takes on a defined logic level high state and the output of a system $\overline{\text{RESET}}$ signal 40 of a transistor 30 is low. $V_{RES}$ is the guaranteed minimum operating voltage of the device. This state is maintained until the voltage of the board reaches a predetermined threshold of about 4.75 volts. The system $\overline{\text{RESET}}$ signal 40 is then converted through an inverter 60 to a high /OE signal 70, which is converted through a second inverter 90 to a low OE signal. The low state of the OE signal disables the tri-state gates 100, 110 of a bilateral buffer 80 which is interposed in signal lines between the system and the board.

When the voltage of a board exceeds the threshold of about 4.75 volts, a timer within the supervisor IC 20 is initialized. Upon the expiration of a timer period, $t_d$ (about 0.61 seconds), the /RESET signal 40 from transistor 30 goes high and normal operation of the board is enabled. This /RESET signal is converted through the inverter 60 to a low /OE signal, which is again converted through the second inverter 90 to a high logic level OE signal within the buffer 80, which enables the tri-state gates 100, 110 of the bilateral buffer 80.

During extraction of a board, power applied to a sense terminal of the TL77xxA 20 will gradually drop. When Vcc is less than 4.75 volts, the transistor 30 outputs a low system /RESET signal 40. The system /RESET signal 40 is converted through an inverter 60 to a high level /OE signal, which is again converted through the second inverter 90 to a logic low signal, which disables the input/output buffer using tri-state gates 100, 110. This condition is maintained until the voltage drops below the stable operating voltage of the supervisor IC 20 (typically about 2 Volts). As shown in FIG. 2, momentary transients in supply voltage also results in the generation of momentary RESET signal which disables the buffer 80 and resets the board in an orderly fashion.

In order to regulate a board reset time in the above process, a circuit for board reset timing utilizes timing capacitor 50. The value of the capacitance of the capacitor 50 is simply calculated based on the following expression.

$$C_T(F) = t_d(s)/(1.3 \times 10^4) \quad \text{[Expression 1]}$$

where $C_T(F)$ is a capacitance-of the capacitor 50 and $t_d$ is board reset time.

A circuit according to the present invention has several advantages: it is inexpensive to construct the circuit; a board can be inserted or extracted during normal operation; and the board reset time is calculated according to a very simple expression.

While the present invention is susceptible to various modification and alternative forms, specific embodiments thereof have been shown by way of example in the drawings and the detailed description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A circuit allowing insertion and extraction of a board in a system during normal operation, the circuit comprising:
   a monitoring circuit, said monitoring circuit detecting a voltage of the board and providing a signal when the voltage is at least equal to a predetermined value;
   a bilateral buffer, said buffer being interposed in a signal line between the system and the board;
   means to enable or disable said bilateral buffer according to the signal of said monitoring circuit, said buffer being disabled when the voltage is below a predetermined value; and
   a reset timing circuit, said reset timing circuit being responsive to said signal from said monitoring circuit, wherein when said detected voltage exceeds said predetermined level, said reset timing circuit is initialized maintaining the board in a reset state and maintaining said bilateral buffer in said disabled state for a predetermined time.

2. A circuit as set forth in claim 1, wherein said monitoring circuit and said reset timing circuit take the form of a power supervisor integrated circuit.

3. A circuit as set forth in claim 2, wherein said means to open or close said bilateral buffer includes an inverter.

4. A circuit as set forth in claim 2, further comprising a timing capacitor, said capacitor being coupled to said power supervisor integrated circuit to determine said predetermined time.

5. A circuit as set forth in claim 4, wherein said capacitor has a value substantially equal to $t_d(s)/1.3 \times 10^4$, where $t_d(s)$ is a reset time of the board.

6. A circuit for maintaining system reliability while inserting and extracting boards from a system, the circuit comprising:

means for monitoring a voltage of a board during insertion and extraction;

means for placing signal lines between the board and the system in a disabled state when the voltage is below a predetermined threshold value;

means for maintaining said disabled state for a predetermined time after the voltage is at least equal to the predetermined threshold value; and means for generating a reset signal, said reset signal being held in a reset state until the expiration of said predetermined time.

7. The circuit as defined by claim 6, wherein said means for monitoring a voltage, said means for maintaining said disabled state, and said means for generating a reset signal are included in a power supervisor integrated circuit.

8. The circuit as defined by claim 7, wherein said power supervisor integrated circuit further includes means for generating a reset signal, said reset signal being held in a reset state until the expiration of said predetermined time.

9. The circuit as defined by claim 8, wherein said means for placing signal lines in a disabled state includes a bidirectional tri-state buffer.

10. A method for maintaining system reliability while inserting and extracting boards from a system, the method comprising the steps of:

monitoring a voltage of a board;

disabling signal lines between the board and the system when the voltage is below a predetermined threshold value;

maintaining said disabling for a predetermined time after the voltage is at least equal to the predetermined threshold value; and generating a reset signal when the voltage is equal to the predetermined threshold value and maintaining the reset signal for the predetermined time.

* * * * *